United States Patent
van Raam et al.

(10) Patent No.: US 9,986,693 B2
(45) Date of Patent: Jun. 5, 2018

(54) PLANT SURFACE STRUCTURE AND MODULES AND METHOD FOR FORMING THE SAME

(75) Inventors: Carolus Hermanus van Raam, Hoogmade (NL); Andrew Bryan Shuttleworth, Poulton-le Fylde (GB); Paul David Culleton, Warrington (GB)

(73) Assignee: Permavoid Limited, Leicester (GB)

( * ) Notice: Subject to any disclaimer, the term of this patent is extended or adjusted under 35 U.S.C. 154(b) by 130 days.

(21) Appl. No.: 14/412,324

(22) PCT Filed: Jul. 5, 2012

(86) PCT No.: PCT/NL2012/050476
§ 371 (c)(1),
(2), (4) Date: Mar. 13, 2015

(87) PCT Pub. No.: WO2014/007605
PCT Pub. Date: Jan. 9, 2014

(65) Prior Publication Data
US 2015/0282438 A1    Oct. 8, 2015

(51) Int. Cl.
*A01G 9/02* (2018.01)
*E01C 3/00* (2006.01)
(Continued)

(52) U.S. Cl.
CPC ............ *A01G 9/02* (2013.01); *A01G 1/001* (2013.01); *A01G 1/007* (2013.01); *A01G 9/1423* (2013.01);
(Continued)

(58) Field of Classification Search
CPC .......... A01G 1/007; A01G 1/002; Y02B 80/32
See application file for complete search history.

(56) References Cited

U.S. PATENT DOCUMENTS

| 2,460,894 A | 2/1949 | Martinovich |
| 2,874,844 A | 2/1959 | Wanner |

(Continued)

FOREIGN PATENT DOCUMENTS

| CN | 101084733 | 12/2007 |
| CN | 101111650 | 1/2008 |

(Continued)

OTHER PUBLICATIONS

ISR & Written Opinion dated Oct. 9, 2013, from PCT/EP2013/064245.

(Continued)

*Primary Examiner* — Kristen C Hayes
(74) *Attorney, Agent, or Firm* — Swanson & Bratshun, L.L.C.

(57) ABSTRACT

Plant surface structure, comprising plastic base elements, each base element having a deck carried by a series of pillar elements, wherein at least a number of the pillar elements have an open top end in said deck, wherein at least a membrane is placed over said deck and is provided with slits or cut-outs or water permeable elements, such that they open into at least some of the open top ends of pillars, wherein a growing medium is provided on the membrane and a growing medium is provided in said pillars, the growing medium in said pillars preferably being in fluid contact with the growing medium on said membrane.

20 Claims, 8 Drawing Sheets

(51) Int. Cl.
*E01C 13/08* (2006.01)
*E04D 11/00* (2006.01)
*A01G 9/14* (2006.01)
*A01G 1/00* (2006.01)

(52) U.S. Cl.
CPC ............ *E01C 3/006* (2013.01); *E01C 13/083* (2013.01); *E04D 11/002* (2013.01); *Y02B 80/32* (2013.01); *Y02P 60/148* (2015.11)

(56) References Cited

U.S. PATENT DOCUMENTS

| | | | |
|---|---|---|---|
| 3,215,118 A | 11/1965 | Behlen | |
| 3,611,997 A | 10/1971 | Benno | |
| 3,848,568 A | 11/1974 | Hazen | |
| 4,176,622 A | 12/1979 | Wolf | |
| 4,280,447 A | 7/1981 | Laurenz | |
| 4,364,331 A | 12/1982 | Foenard | |
| 5,218,783 A | 6/1993 | Langezaal | |
| 5,373,661 A * | 12/1994 | Furukawa | E01C 13/02 47/18 |
| 5,437,698 A * | 8/1995 | Furukawa | E01C 13/02 47/1.01 R |
| 5,724,916 A | 3/1998 | Brodie | |
| 5,967,092 A | 10/1999 | Pederson | |
| 6,237,285 B1 * | 5/2001 | Yoshida | A01G 1/007 47/65.9 |
| 6,499,433 B2 | 12/2002 | Notenbomer | |
| 6,511,257 B1 | 1/2003 | Seaux | |
| 6,606,823 B1 * | 8/2003 | McDonough | E04D 11/002 47/65.9 |
| 6,694,672 B1 * | 2/2004 | Hergeth | E01C 13/083 47/65.9 |
| 6,732,666 B2 * | 5/2004 | Layt | A01G 9/02 111/105 |
| 6,779,946 B1 | 8/2004 | Urriola | |
| 6,898,909 B2 | 5/2005 | Prat | |
| 7,014,390 B1 | 3/2006 | Morris | |
| 7,596,906 B2 * | 10/2009 | Gold | E04D 11/002 47/1.01 F |
| 7,603,808 B2 * | 10/2009 | Carpenter | A01G 9/02 47/65.5 |
| 7,676,987 B2 | 3/2010 | Yoshida | |
| 7,704,011 B2 | 4/2010 | Marshall | |
| 7,716,873 B2 * | 5/2010 | Irwin | A01G 1/005 47/65.9 |
| 7,827,938 B2 | 11/2010 | Kuehlmann | |
| 7,914,228 B2 | 3/2011 | Rapaz | |
| 8,128,312 B2 | 3/2012 | Stuchell | |
| 8,209,905 B2 * | 7/2012 | Furumura | A01G 27/02 47/65.9 |
| 8,272,163 B2 * | 9/2012 | Dubner | E04D 11/002 47/65.9 |
| 8,414,217 B2 | 4/2013 | Rosan | |
| 8,464,490 B2 | 6/2013 | Rapaz | |
| 8,479,443 B2 * | 7/2013 | Buist | A01G 1/007 47/65.9 |
| 8,555,586 B2 | 10/2013 | Lowe | |
| 8,657,695 B2 | 2/2014 | Wilson | |
| 8,790,037 B2 | 6/2014 | Culleton | |
| 9,015,992 B1 * | 4/2015 | Livingston | A01G 1/007 47/65.9 |
| 9,167,743 B2 * | 10/2015 | Li | A01G 1/005 |
| 9,265,200 B2 * | 2/2016 | Buist | A01G 1/007 |
| 2003/0186025 A1 | 10/2003 | Rapaz | |
| 2003/0188505 A1 | 10/2003 | Marshall | |
| 2005/0042394 A1 | 2/2005 | Sawyer | |
| 2005/0044791 A1 * | 3/2005 | Morandini | A01G 9/00 47/65.9 |
| 2005/0076855 A1 | 4/2005 | Throndsen | |
| 2006/0045994 A1 | 3/2006 | Dipple | |
| 2006/0081159 A1 | 4/2006 | Chapman | |
| 2006/0124074 A1 | 6/2006 | Koelker | |
| 2007/0157514 A1 * | 7/2007 | Carpenter | A01G 9/02 47/65.9 |
| 2008/0149188 A1 | 6/2008 | Zimmerman | |
| 2008/0236041 A1 * | 10/2008 | Carpenter | E04D 11/002 47/65.9 |
| 2009/0260284 A1 * | 10/2009 | Barbalho | A01G 1/007 47/65.9 |
| 2010/0064580 A1 * | 3/2010 | Irwin | A01G 1/005 47/65.9 |
| 2012/0040767 A1 | 2/2012 | Wilson | |
| 2012/0163911 A1 | 6/2012 | Culleton | |
| 2012/0178542 A1 | 7/2012 | Culleton | |
| 2012/0291714 A1 | 11/2012 | Stal | |
| 2012/0321389 A1 | 12/2012 | Kreikemeier | |
| 2013/0284397 A1 | 10/2013 | Storm | |
| 2014/0026480 A1 * | 1/2014 | Lenhart, Jr. | A01G 1/007 47/65.9 |
| 2014/0059926 A1 * | 3/2014 | Li | A01G 1/005 47/32.7 |
| 2014/0270945 A1 | 9/2014 | Bach | |
| 2014/0286704 A1 | 9/2014 | Bennett | |
| 2015/0181813 A1 | 7/2015 | Van Raam | |
| 2015/0334980 A1 | 11/2015 | Van Raam | |
| 2017/0030026 A1 | 2/2017 | Van Raam | |

FOREIGN PATENT DOCUMENTS

| | | |
|---|---|---|
| CN | 100436723 C | 11/2008 |
| CN | 101323510 | 12/2008 |
| CN | 101608491 A | 12/2009 |
| CN | 201460055 U | 5/2010 |
| CN | 201541554 U | 8/2010 |
| CN | 201919461 | 8/2011 |
| CN | 202077460 U | 12/2011 |
| CZ | 22468 | 7/2011 |
| DE | 9207171 U1 | 7/1992 |
| DE | 29610425 U1 | 11/1996 |
| DE | 19911409 A1 | 9/2000 |
| DE | 202011106604 U1 | 11/2011 |
| EP | 0266701 A2 | 5/1988 |
| FR | 2671121 A1 | 7/1992 |
| JP | 06209655 | 8/1994 |
| JP | 200245043 | 2/2002 |
| NL | 1018903 | 3/2003 |
| WO | WO 2002/014608 | 2/2002 |
| WO | WO 2009/030896 | 3/2009 |
| WO | WO 2011/007128 | 1/2011 |
| WO | WO 2012/050529 | 4/2012 |
| WO | WO 2014/006180 | 1/2014 |

OTHER PUBLICATIONS

ISR dated Aug. 2, 2013, from PCT/NL2012/050629.
Office Action from CN Application No. 201380043173.5 dated Dec. 20, 2016.
Office Action from U.S. Appl. No. 14/207,139 dated Jun. 17, 2015.
Office Action from U.S. Appl. No. 14/412,481 dated May 25, 2017.
Office Action from U.S. Appl. No. 15/124,786 dated Mar. 29, 2017.
Office Action and Search Report from CN 201380043173.5 dated Jan. 12, 2016 with English Translation.
International Search Report from PCT/EP2015/055032 dated May 1, 2015.
Notice of Allowance from U.S. Appl. No. 14/207,139 dated Oct. 24, 2016.
Office Action from CN Application No. 201280075713.3 dated Mar. 28, 2016.
Office Action from U.S. Appl. No. 14/207,139 dated Apr. 6, 2016.
Office Action from U.S. Appl. No. 14/424,285 dated Apr. 14, 2016.

* cited by examiner

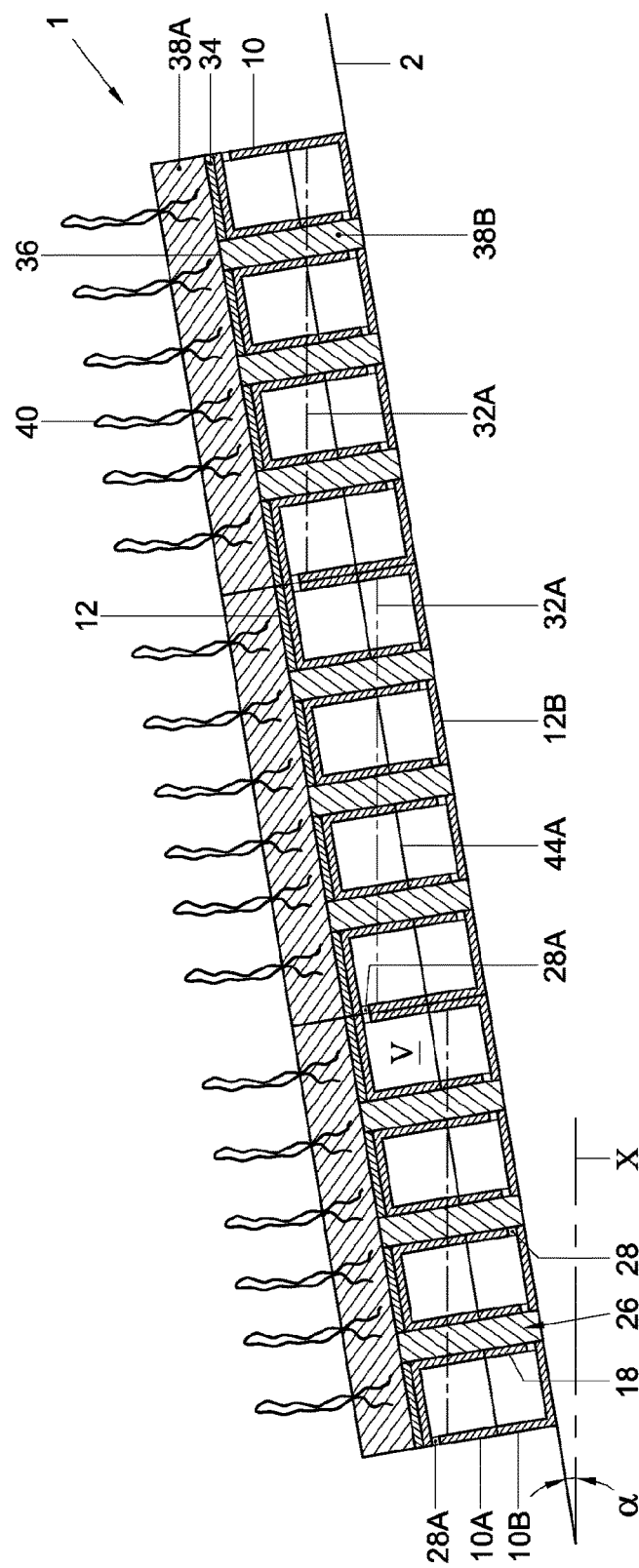

PLANT SURFACE STRUCTURE AND MODULES AND METHOD FOR FORMING THE SAME

RELATED APPLICATIONS

This application is a 35 U.S.C § 371 national phase application of PCT/NL2012/050476 (WO 2014/007605), filed on Jul. 5, 2012, entitled "Plantsurface Structure and Modules and Method for Forming the Same", which is incorporated herein by reference in its entirety.

The invention relates to a plant surface structure. The invention further relates to modules for forming a plant area. Furthermore the invention relates to a method for forming a plant area.

Plants such as but not limited to grass, bushes, flowers, plants, trees, herbs, vegetables and the like are known to be planted directly into the ground, such as for example a field, flowerbed or the like. The provision of the right amount of water and nutrition to these plants may be difficult. One has to rely on for example rain or such natural irrigation and the earth then has to retain a sufficient amount of water to last the plants until a next shower. Alternatively one can provide for artificial irrigation, such as spraying.

It is known to grow plants such as vegetables for example in green houses, in which the plants are planted in tubes filled with growing medium such as stone wool or rock wool, saturated with water with nutrients. In such systems the amount of water available to the plants can be relatively well controlled. However, these systems will lead to a lot of waste. Moreover such systems are not equipped for covering larger areas.

It is furthermore known to grow plants in open trays filled at least partly with a grow medium such as soil. A water reservoir can be provided in said tray, open towards the grow medium, in which for example rain can be collected. A wick can extend from the grow medium into said reservoir for feeding water to the grow medium.

An aim of the present disclosure is to provide for an alternative plant surface structure. An aim of the present disclosure is to provide for a plant surface structure with a water reservoir, preferably such that water can be fed easily to a grow medium, for keeping the grow medium sufficiently moist over longer periods of time. An aim of the present disclosure is to provide for a plant surface structure that is suitable for covering large areas and/or relatively flat areas and/or sloping areas. An aim of the present disclosure is to provide for a plant surface structure for forming an area providing for an even support of people and/or animals and/or traffic moving over said surface area. An aim of the present disclosure is to provide modules for forming a plant surface structure or plant area.

At least one of these and other aims is obtainable with a plant surface structure and modules therefore according to this disclosure.

In a first aspect a plant surface structure of this disclosure can be characterised by a plant surface structure, comprising an array of plastic base elements, having a deck carried connected to a series of pillar elements. The deck can be provided with openings and at least a number of the pillar elements have an open top end in said deck. At least a membrane can be placed over said deck, provided with slits or cut-outs, such that they open into at least some of the open top ends of pillars. A growing medium is provided on the modules, preferably supported by the membrane and a growing medium is provided in said pillars into which slits or cut outs open. The growing medium in said pillars is preferably in fluid contact with the growing medium on said modules.

The base element can be box shaped element, having at least a bottom and said deck, spaced apart and connected to each other by the pillars. The base element may have side walls and preferably encloses an internal volume, in communication with the growing medium in said pillars. The internal volume can be designed for containing a volume of water that can be transported from the internal volume of the base element to the growing medium on the membrane through the growing medium in the pillars. Base elements can be interconnected forming a base structure. Interconnected base elements preferably each have an internal volume, the internal volumes being in fluid connection, effectively forming a joined internal volume. The deck of a base element can be substantially flat, such that interconnected base elements can provide for a substantially flat continuous surface area, which can be partly or entirely covered by said membrane and by a layer of growing medium. Preferably the layer of growing medium has a substantially even thickness over said area, and more preferably a substantially even constitution over said area.

The membrane can be placed over the deck or joined decks, and can be connected to the or each deck by locking elements locking the membrane into the pillar or opening in the deck opening into the pillar. To this end the membrane, especially an edge portion of the slit or cut-out can be pushed into the pillar or opening in the deck opening into the pillar and be held in place by the locking element forced into said opening or open top of the pillar. The locking element can for example fit in said opening or pillar end by a form lock, a snap lock, threading or any other suitable means.

A base element of this disclosure can for example be made of plastic and can have a deck which is resiliently flexible for providing added flexibility to an area made using such base elements.

A plant area comprising or formed by plant surface structures of this disclosure or manufactured with a method of this disclosure can for example be a sports field, recreation area, sloping surface of a road or track side, slope or dike, garden area or crop field or any such area for growing plants.

In embodiments the at least one membrane or layer, or, if two or more such membranes are provided, at least one of the membranes or layers provided on top of the modules, supporting the substrate directly or indirectly, for example by means of a sub layer, can be fluid tight, especially substantially water impermeable, such that water cannot pass through said membrane into or out of the module, unless specific provisions are provided in said membrane, such as openings, valves, water permeable elements, such as filters or drainpipes or the like, opening into or out of the said modules. In embodiments at least one membrane on top of the modules can be fluid permeable, especially water permeable, such that fluid, especially water can pass through the membrane into and/or out of the module.

In further elucidation of the present invention embodiments of the present disclosure, such as embodiments of a plant surface structure and plant areas formed therewith, as well as methods for forming the same shall be described hereafter, with reference to the drawings. In the description a base element for a plant surface structure of this disclosure will also be referred to as module.

FIG. 8 shows schematically in side view a series of modules, on a sloping surface.

In this description embodiments of the invention will be described with reference to the drawings by way of example only. These embodiments should by no means be understood as limiting the scope of the disclosure. At least all combinations of elements and features of the embodiments shown are also considered to have been disclosed herein. In this description the same or similar elements and features will be referred to by the same or similar reference signs.

In this description expressions of orientation such as top, bottom, vertical etcetera are used for convenience only and refer to the orientation of the module as seen in the accompanying drawings. Such expressions are not to be regarded as limiting the orientation of the module in use, and indeed, as will be described below, modules according to the description can be used in other orientations, including at least at sloping surfaces.

In this description a growing medium has to be understood as any material or mixture or combination of materials, either artificial or natural, suitable for supporting growth and cultivation of plants, in the broadest possible sense, including but not limited to grass, bushes, flowers, plants, trees, herbs, vegetables and the like. Suitable growing mediums can for example be but are not limited to soil, mixtures of soil and fibres and/or pellets, artificial or natural fibre materials such as but not limited to stone- or rockwool, coconut fibres or the like. In this description a substructure has to be understood as any artificial or natural surface on which modules according to the description can be placed and supported, either directly or indirectly, such as but not limited to ground, soil, sand, clay or such natural surfaces, or roofs of buildings, or concrete, tarmac, brick or such artificial surfaces.

In this description membrane has to be understood as including but not limited to any kind of woven or non woven sheet or foil, made of any plastic or natural material or mix of material, including but not limited to plastic sheet or foil, natural fibers, geo-textiles, water permeable and/or water impermeable materials and the like. Preferably the membrane will be flexible, such that it can be placed from a roll or as relatively large sheets, compared to the sizes of the modules to be described. However, the membrane can also be provided in different ways, for example as tiles or as an in situ coating.

Figure 1:
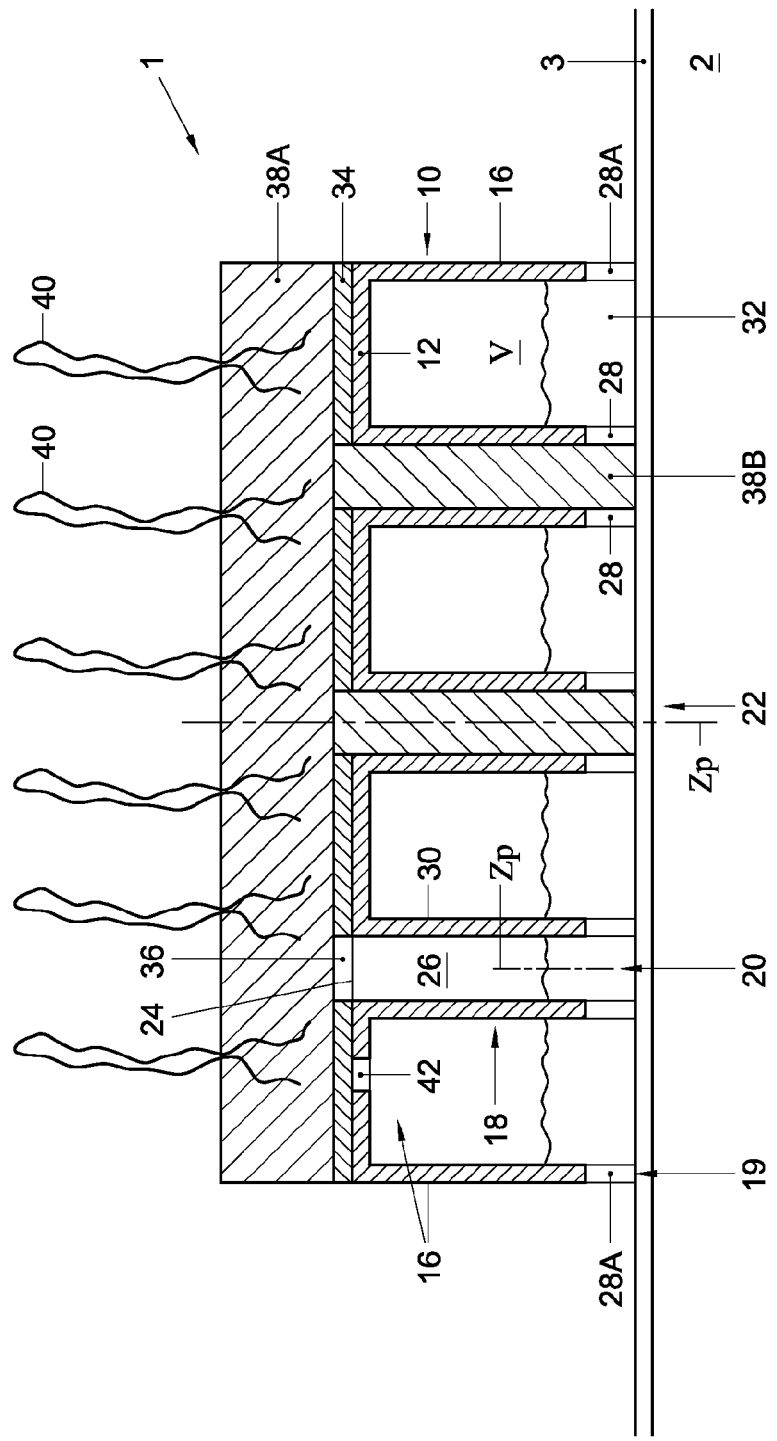
FIG. 1 shows in cross section schematically a plant surface structure, comprising a base element with a deck and pillars, membrane and growing medium.
Figure 2:
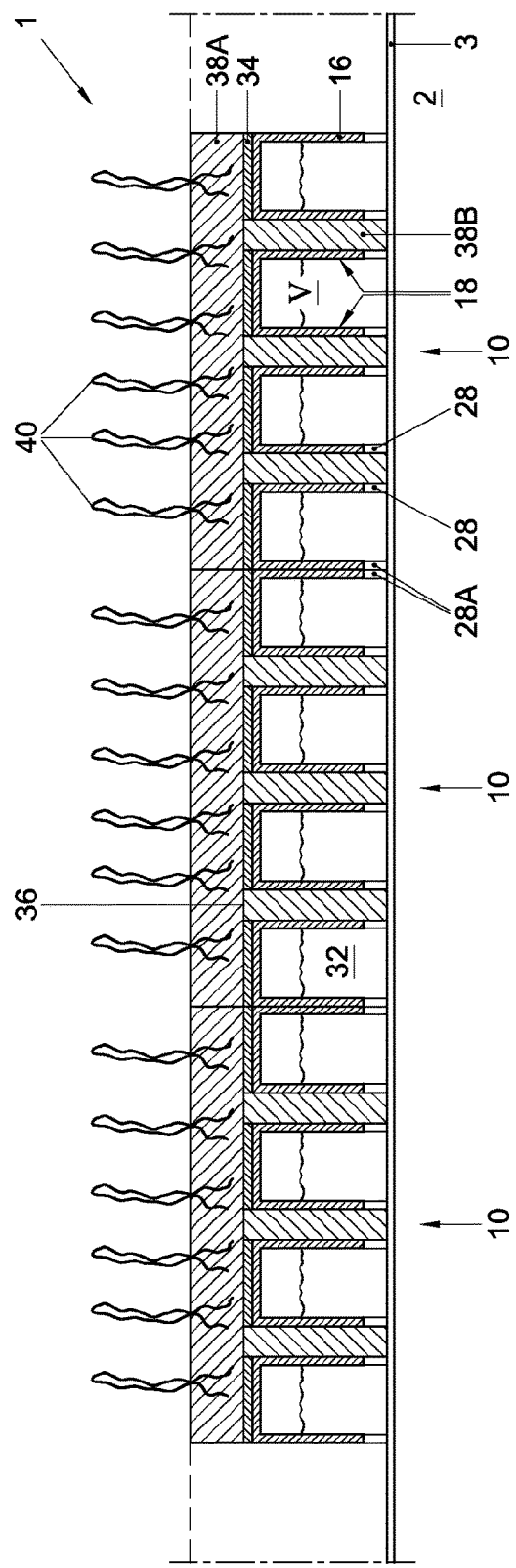
FIG. 2 shows in cross section schematically a series of plant surface structures, interconnected and forming a surface area.

FIGS. 1 and 2 show schematically in a cross sectional side view a plant surface structure 1 according to this disclosure, in a first embodiment, comprising a base element 10 comprising a deck 12 forming a top wall, and can be provided with side walls or a peripheral side wall 16 extending down from a peripheral edge 14 of the deck 12. The deck is carried by a series of pillars 18 extending from the deck 12 downward. The base element or module 10 can be positioned on a substructure 2, such as bed of sand or soil, on a floor such as a concrete floor, or on any suitable substructure, such that lower ends 20 of the pillars 18 and/or the lower ends 19 of the wall or walls 16 rest on the substructure 2 or a layer 3 provided thereon. Preferably both the wall 16 and at least a number of and more preferably all pillars 18 support the module 10 on the substructure, such that a more even distribution of forces between the deck 12 and the substructure 2 is obtained.

In this embodiment the module 10 is largely open at a bottom side 22. On the substructure 2 a membrane or layer 3 can be provided, such as for example a sheet of fabric or plastic foil or any other suitable membrane. Such layer can for example be a geo-textile. In embodiments the layer can be a water impermeable layer, preventing water from flowing out of the modules into the substructure or vice versa. In embodiments the layer 3 can be used for preventing movement of the substructure, such as for example preventing erosion of the substructure 2. In embodiments the layer can be provided for covering the substructure 2 in order to prevent for example chemicals to enter into the modules 10, which can for example be beneficial when the modules are used for covering polluted areas such as but not limited to waste land, garbage areas or the like. Alternatively the layer 3 can prevent fluids from entering into the substructure. Thus the plantstructure can be used in environments wherein for example products are used that can be detrimental to the substructure or should be prevented from entering into a surface material or an eco system, such as entering into ground water.

As can be seen in FIGS. 1-8 at least some of the pillars 18, which can also be referred to as columns, have a substantially open top end 24 in the deck 12. In the embodiment shown it can be seen that the pillars 18 are hollow and form a substantially open channel 26 between the open top end 24 and the lower end 20.

In the embodiments shown the pillars 18 can have any suitable cross section perpendicular to their longitudinal axis Zp, for example but not limited to a circular, square, rectangular or polygonal cross section. The cross section can be substantially the same over the longitudinal length of the pillar, seen along the axis Zp, but the cross section can also vary. The pillar can for example be partly or entirely conical, for example such that it has a draft suitable for injection moulding or a stronger draft. Suitable shapes and dimensions will be directly apparent to the skilled person. The modules 10 are preferably made integrally, including the pillars 18, deck 12 and walls 16, for example by injection moulding. Alternatively they can be assembled from different parts.

The pillars 18 can be provided with one or more opening 28 extending through the wall 30 of the pillar 18, connecting the channel 26 with an internal volume V of the module 10. In this embodiment the internal volume V is enclosed between the deck 12, the side wall or side walls 16 and the substructure 2, between the pillars 18. In the embodiment shown in FIGS. 1, 3, 4 and 8 the openings 28 are provided near or at the lower ends 20, close to or directly adjacent the substructure 2. However openings 28 can be provided in any suitable position, for example at different longitudinal positions between the lower en top ends 20, 24. Similar openings 28A can be provided in the side wall or peripheral wall 16. Such additional openings 28A can also be provided at different positions along the wall or walls 16, for example at different heights.

In FIGS. 1 and 2 schematically a volume or body of water 32 is shown in the internal volume V of the module 10. The substructure 2 and/or the layer 3 can at least partly close off the open bottom side 22 of the module 10, such that the body of water 32 can be retained inside the internal volume V for an extended period of time. In such embodiments the internal volumes V of adjacent modules can be in communication with each other, for example through the openings 28A in the walls 16, such that these internal volumes V effectively form an integrated internal volume. This can be beneficial for obtaining a desired distribution of water through an array of such modules, as will be explained. By specific positioning the openings 28A the openings 28A can act as weirs, defining a water level in a module before water can flow over to an adjacent module 10 through such opening 28A.

As can be seen in FIGS. 1, 2, 3 and 8 a layer of fabric 34 is placed on top of the deck 12, covering the deck 12 at least partly and preferably entirely. Initially the fabric 34 may be a closed sheet or foil covering the entire deck 12. As can be seen in FIG. 1 in the left hand side pillar 18 which is shown empty for clarity sake, a slit or cut out 36 has been provided in the fabric 34, directly over the open end 24 of said column 18. Similar slits or cut outs 36 have been provided for other pillars 18, forming an open connection between an upper side of the fabric 34 and the channel 26 in the respective pillars 18. The slits or cut-outs 34 can be made in situ, that is when placing the fabric 34 over the module or array of modules 10, for example by cutting, tearing, drilling or otherwise providing the opening in the fabric 34 into the or each respective pillar 18. The advantage thereof can be that the cut-outs or slits can be provided at will in positions where they are desired. Alternatively the slits or cut-outs 34 can be provided pre-fabricated in the fabric 34. The fabric can for example be a perforated sheet or foil, with openings 34 arranged in a pattern, at least in part corresponding with the pattern of the open ends 24 of at least a number of the pillars 18 of the modules 10.

As is shown in FIGS. 1, 2, 3 and 8 on the fabric 34 at least one layer of a growing medium 38A is provided, covering the fabric 34 and thus the module 10. In the channels 26 of at least a number of the pillars 18 also an amount of a growing medium 38B is provided, which can be directly or indirectly in communication with the layer of growing medium 38A on the fabric through the open ends 24. In embodiments the growing medium 38 on the fabric can be the same as the growing medium inside the channels 26. In other embodiments the growing mediums 38A, 38B can be different in for example material, consistency, compactness or other such aspects.

As can be seen in the drawings, the growing medium present in the pillars 18 can be in contact with the volume of water 32 inside the modules 10 through the opening or openings 28, as well as with the growing medium 38A on top of the fabric 34. Thus water will be transported from the volume of water 32 to the growing medium 38A on top of the fabric through the growing medium 38B inside the channels 26. This will be a natural transport such that any water removed from the growing medium 38A on top of the fabric, for example by use by the plants 40 or evaporation, drainage or otherwise, will be replenished from the volume of water 32 in a suitable pace. This pace can for example be influenced by the number of and distribution of the pillars 18 filled with the growing medium, the amount and type of growing medium inside the pillars and on the fabric, the longitudinal depth to which extend the channels is or are filled and the size and distribution of the openings 28.

As can be seen in FIGS. 1, 2, 3 and 8 plants 40 can be placed in the growing medium 38A on top of the deck 12. The plants can be set wide apart, such as in a cultivating area or flower bed, or in close arrays, such as in a grass field or pitch.

Figure 4:
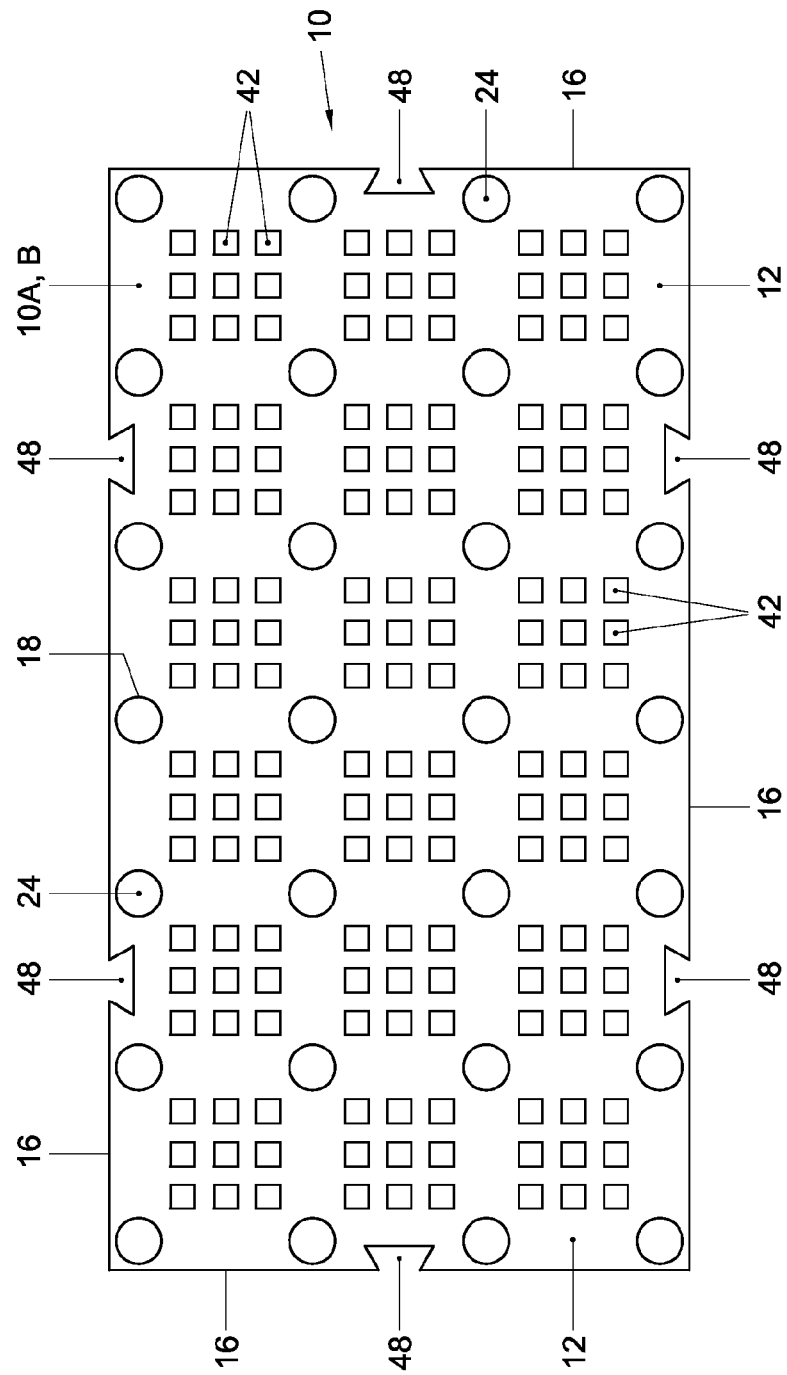
FIG. 4 shows schematically in top view a base element, in a first embodiment.
Figure 5:
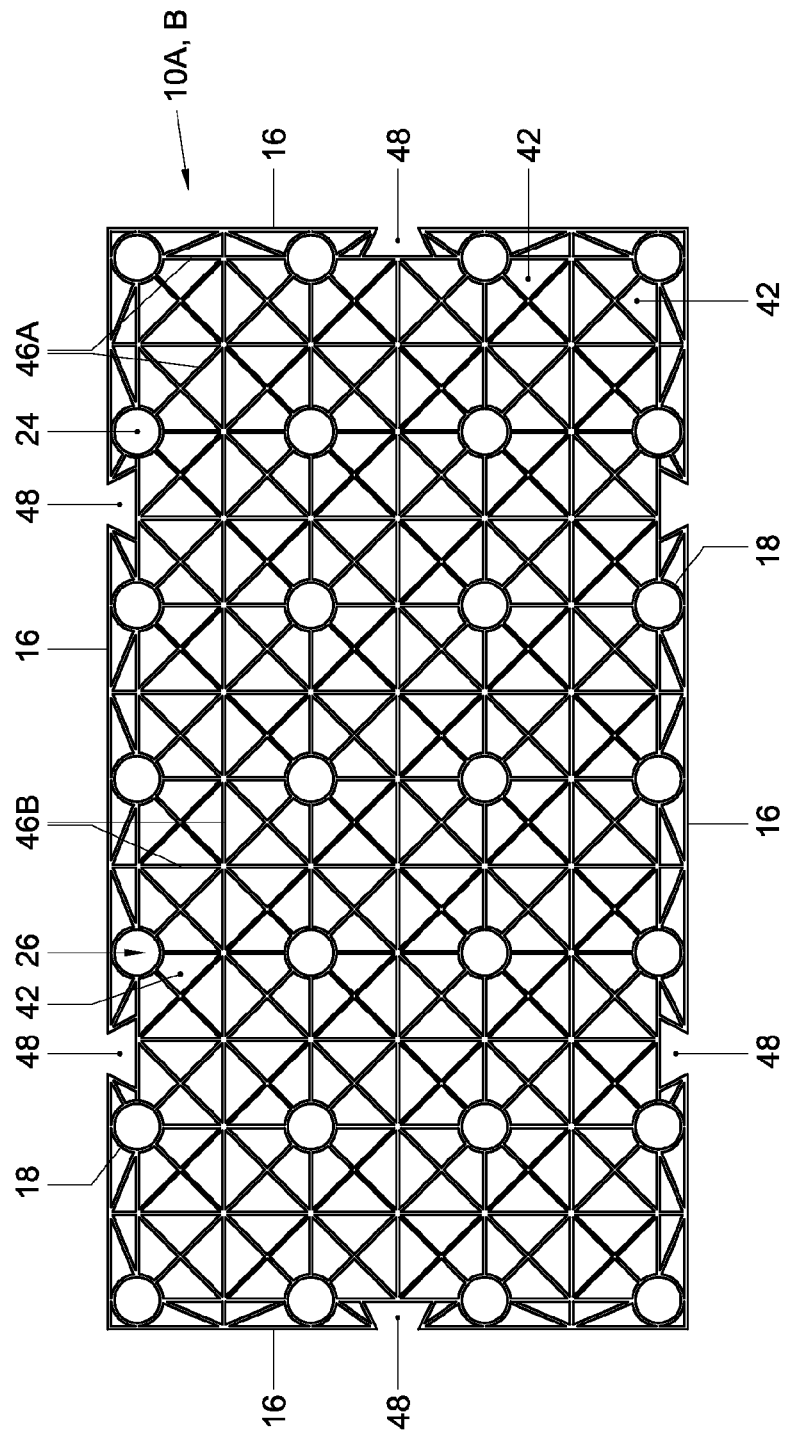
FIG. 5 shows schematically in top view a base element, in a second embodiment.
Figure 6:
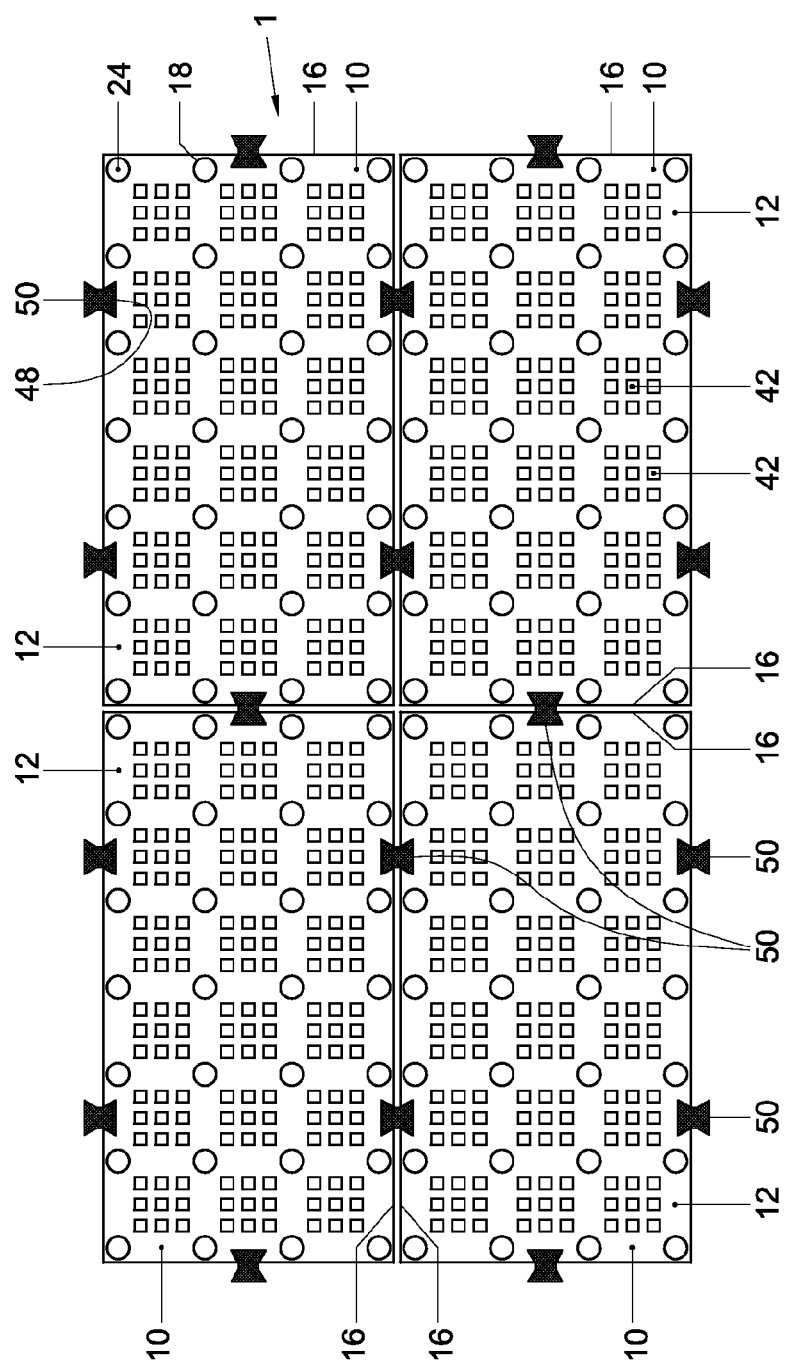
FIG. 6 shows schematically in top view a series of modules interconnected.

The deck 12 can be provided with additional openings 42 extending into the internal volume V. These openings 42 can be covered by the fabric 34, such that the growing medium 38A cannot pass into and through the openings 42. In FIGS. 4-6 embodiments of the modules 10 are shown in top view, showing open ends 24 of pillars 18 and openings 42. The fabric 34 can be water permeable, such that water can pass from the growing medium 38A through the fabric 34 and the openings 42 into the internal volume V of the modules 10, to be retained therein or to flow away. This can for example prevent the growing medium from becoming saturated or even over saturated with water. Moreover this allows the volume V to be filled with water from above, for example by rain or irrigation. Additionally or alternatively water from the internal volume can evaporate through the openings 42 and be absorbed by the fabric and/or the growing medium 38. Alternatively the structure can be used as a tidal system, by filling the modules by providing a flow of water through the modules, such that the water level rises, for example to a level close to or in the openings 42, and then draining the water again. The fabric can be water impermeable, closing off the openings 42, which can for example be advantageous when evaporation of water from the internal volume V should be prevented, for example when the modules 10 are used in relatively hot environments, such as but not limited to tropical or semi-tropical environments. The fabric can be air permeable, such that air can enter into the growing medium 38A from below, for example through the openings 42, in order to aerate the growing medium and/or the plants 40. A natural or forced air flow could be provided through the modules 10 to promote such aeration.

In FIG. 2 a series of modules 10 is shown, interconnected in a suitable way, for forming a larger area suitable for growing plants 40. The decks 10 of the modules 10 preferably form a substantially flat or continuous surface area, and are covered by the fabric 34 extending over the series of modules. The modules can be arranged in a matrix of rows and columns, as is for example shown in top view in FIG. 6 showing four modules 10, for covering any size and/or shape area. As discussed the internal volume V can be a continuous volume throughout the area or part thereof. Alternatively modules 10 could be provided with closed peripheral walls, that is free of openings 28A or such openings blocked, such that some or all of the modules have their own closed internal volume V. In general the growing medium 38B in the channel or channels 26 will lead to wetting of the growing medium 38A in a substantially circular area around the relevant opening 24. By strategic filling of some channels 26 and leaving others empty or partly empty a specific desired wetting pattern of the plant area can be obtained. Alternative to or additional to the growing medium 38A a wick can extend into one or more of the pillars, for directing a flow of water.

Figure 3:
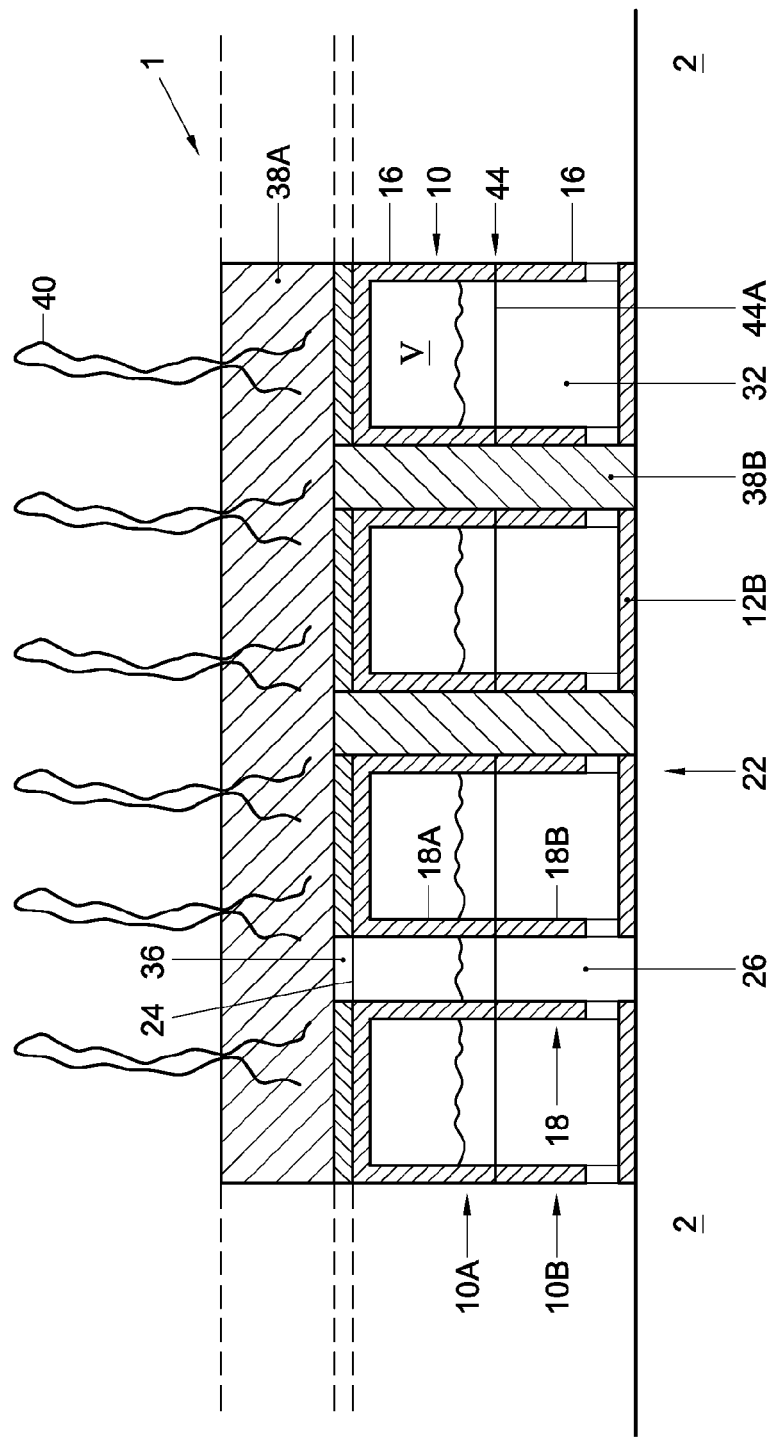
FIG. 3 shows in cross section schematically an alternative embodiment of a plant surface structure, wherein the base element comprises or is formed as a substantially box shaped module with an internal volume for retaining water and/or allowing water and/or air flow.

In FIG. 3 schematically an alternative embodiment is shown, wherein the module or base element 10 is box shaped. In general this can be understood as that the module 10 is comparable to that as shown in FIG. 1, but is provided at the bottom side 22 with a bottom 12B. This could be a bottom element attached to the bottom 22 of the module 10 as disclosed and discussed with reference to FIGS. 1 and 2. In the embodiment shown in FIG. 2 the module 10 formed by connecting two module parts 10A, 10B over a connecting area 44 indicated in FIG. 3 by the line 44A. This connection can be made in any suitable way, either permanently or reversibly. The connection can for example be made by welding, gluing, clicking, screwing or any other suitable way known to the person skilled in the art. In the embodiment of FIG. 3 each part 10A, B comprises a part of a side or peripheral wall 16 and part of the pillars 18. The lower part 10B comprises a bottom 12B, similar to the deck 12, such that the module can be placed on a substructure supported at least largely by the bottom 12B.

In embodiments internally the module 10 can contain pillars 18 extending vertically between the deck and bottom 12, 12B which can aid in resisting vertical deformation or crushing of the module 10. In embodiments the module 10 can be assembled from two substantially identical integral components 10A, 10B moulded from a rigid plastics material and which are fitted one inverted on top of the other. Each pillar 18 thus comprises two half-pillars or male and female parts 18A, 18B respectively, one part being integral with one component 10A or 10B and the other part being integral with the other component 10A or 10B. In embodiments male parts 18A can alternate with female parts 18B in each component 10A and 10B such that when the two components are fitted together the male parts 18A of each component enter the respective female parts 18B of the other component to form the complete pillars 18. To avoid over insertion of the male parts into the female parts, and to maintain the top and bottom walls 12 and 14 at their correct separation, each male part can for example comprise a shoulder 18C which abuts against the open end 18D of the respective female part when the components 10A and 10B are fully engaged, as is for example schematically shown in FIG. 7.

As shown in FIG. 4 the deck 12 and, if applicable, the bottom 12A of a module 10 can be formed by a sustainably closed plane comprising the openings 42 and open ends 24 of the pillars 18. In this embodiment the openings 42 have a substantially square cross section, but they can have any cross section desired, such as but not limited to round, oblong, polygonal or the like.

In FIG. 5 an alternative embodiment is shown, wherein the deck 12 and, if applicable, the bottom 12A can be formed substantially open. The deck 12 and/or bottom 12A can be formed substantially by a structure of intersecting ribs 46A, B extending between at least open ends 24 of pillars 18 and between open ends 24 of pillars and side walls 16 of the base element 10, and/or between other ribs.

In embodiments the bottom 12B can be according to FIG. 4 and the deck 12 could be according to FIG. 5 or vice versa.

As can be seen in FIGS. 4, 5 and 6 the module 10 can be provided with side wall channels 48, extending over part or all of the height of the module 10 or a module part 10A, B, which can have a cross section non-releasing in the direction of the relevant side 16 of the module. In the embodiment shown the side wall channels 48 have a substantially dove tail shape cross section. When two modules are appropriately placed next to each other, side walls 16 facing and abutting, at least two such side wall channels 48 will be adjacent to each other and open to each other, forming a substantially bow-tie or butterfly shaped joined channel. A locking element 50 having a shape complementary to the joined channels 48 can be press fit into said joined channels 48, locking the modules to each other. As can be seen several such channels 48 can be provided on all sides of the modules 10, assuring a very firm connection between all modules.

Obviously other such locking elements 50 and complementary channels 48 could be provided or other means for coupling the modules.

The modules 10 can contain a network of bracing members to resist geometric deformation of the module in a horizontal plane and/or in vertical direction. The bracing members can for example be formed by the ribs 46A, B as shown in FIG. 5 and/or extend in a pattern as shown in FIG. 5, and can be internal within the internal volume of the module, for example below a deck 12 as shown in FIG. 4. The ribs 46A can for example extend parallel to a side wall or diagonally between pillars 18 and can comprise or form vertical webs having apertures to allow fluid flow horizontally through the module 10 in any direction. The webs can be orientated vertically such that they do not obstruct fluid flow in the vertical direction. Each rib and/or web can be formed of upper and lower halves integral with upper and lower components 10A, 10B respectively, and can have facing non-straight or at least not completely connecting edges, such as for example concave or wavy edges defining apertures between them. In embodiments the edges can be parabolic. Between the ribs 46A and/or webs further ribs 46B can be provided, which can also form or comprise webs extending into the inner volume V and can serve to break down voids within the volume V. As viewed from above in FIG. 5, they can extend substantially normally between the bracing ribs 46A and supplement the bracing effect of the latter. By way of example and not limiting the disclosure, in embodiments the ribs 46A, B can for example be a few millimeters thick, for example about 5 mm thick and can extend downward or upward from the deck 12 or bottom 12B in a direction normal to the page a few millimeters to several centimeters and can bridge about all of the internal height of the module.

Figure 7:
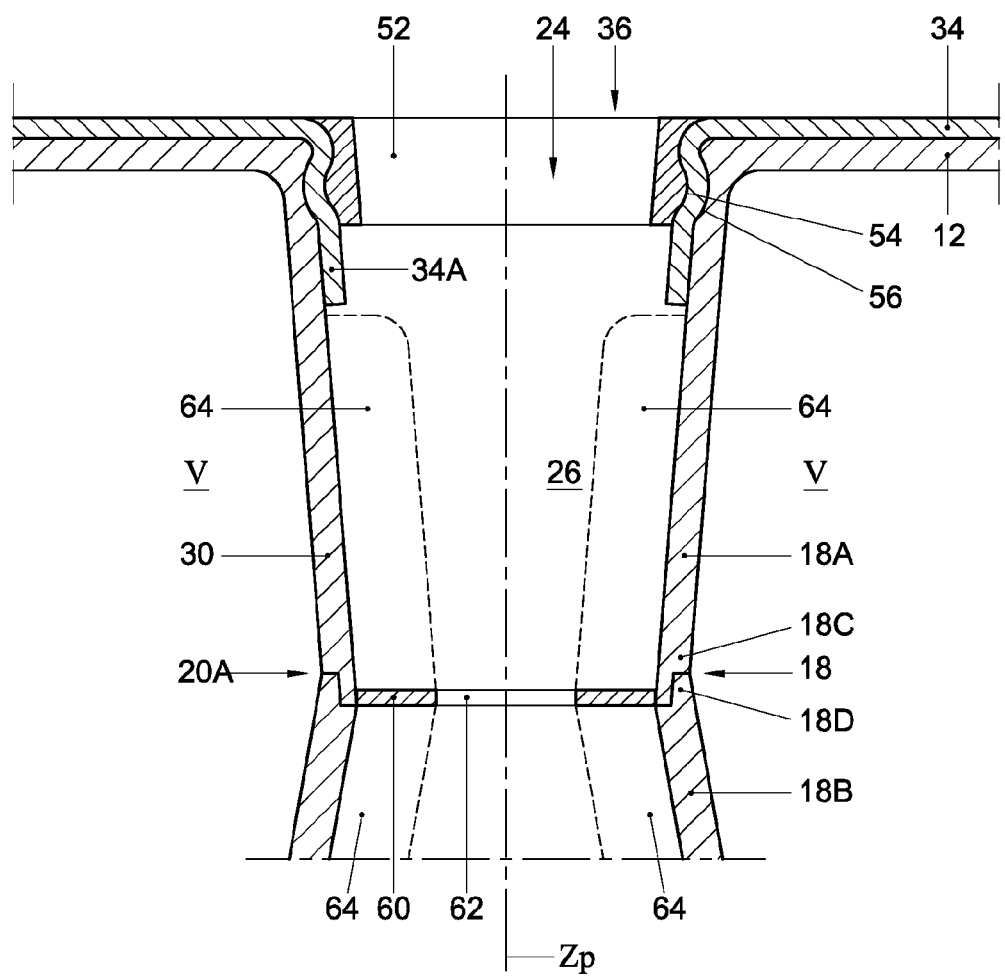
FIG. 7 shows schematically a detail of the membrane locked by a locking element.

In FIG. 7 schematically in enlarged scale part of a module 10 with a deck 12 covered by fabric 34 is shown, with part of a cross section of a pillar 18 showing the wall 30 and a joining between two pillar halves 18A, B with shoulders 18C, D. In this embodiment the fabric 34 is connected to the module 10 by press fitting a locking element 52 into the open end 24 of a pillar 18, through a cut out or slit 36 in said fabric 34, such that part of the fabric 34, especially an edge portion 34A of the cut-out opening or slit 36 is forced into the channel 26 of the pillar 18 and is locked between the locking element 52 and the wall 30 of the pillar 18 and/or an edge portion of the deck 12 at the opening 24. In the embodiment shown the locking element is shown, by way of example only, as a ring shaped element 52, comprising a slightly conical shape, with a peripheral snap ring 54 extending outward, which can snap into a peripheral groove 56 provided in the wall 30 of the pillar 18 just below the deck 12. Thus by pressing the ring with the smaller end of the ring 52 forward into the opening 24, the fabric edge 34A is forced over the groove 56 where after the snap ring 54 is pressed into said groove, forcing the fabric into the groove 56 too. This will lock the ring 52 by form lock into the opening 24. It shall be clear that all kinds of alternative locking provisions can be provided for locking the fabric and/or a locking element in said opening 24, such as but not limited to press fitting under friction, snap fitting the ring under an undercut edge of the deck, matching, preferably coarse screw threads or bayonet elements on ring 52 and the opening 24, or by for example adhesion. In embodiments the locking elements 52 can be designed to form the opening referred to as a slit or cut-out 36 in the fabric 34 in situ, during insertion thereof into the opening 24. By using such locking elements the fabric can be provided secure and preferably relatively taut over the deck 12 without the need to provide additional openings in the fabric or for example adhesives. The locking member 52 can be provided either fixed or releasably. Alternatively the deck 12 can for example be provided with one or more slits into which an edge of the fabric 34 can be inserted and clamped. Such slit can for example be substantially triangular, such that the edge can be pulled tight into the tight end of the slit.

The channel 26 can be provided with one or more restrictions, such as but not limited to flanges or ridges extending into the channel 26 from the wall 30, such that growing medium is prevented or at least restricted in falling further down the channel towards the end 20 thereof. In FIG. 7 such restriction is shown as a flange 60 extending from near the end 20A or shoulder 18C of the pillar half 18A, inward into the channel, leaving only an opening 62 in the channel with a cross section smaller than the cross section of the directly adjacent part of the channel 26. Such restrictions can be provided in different or several positions, and could for example be formed by ribs 64 extending substantially parallel to the longitudinal axis too, as schematically shown by dashed lines in FIG. 7, in a direction of release of the pillar in a manufacturing mould. The restrictions can limit the depth into which the growing medium can be inserted and prevent it from being pushed further due to for example gravity, vibrations or impact pulses.

In general modules can be used as disclosed as structural modules in for example WO0214608, WO2011/007128 or WO2011/007127, all of which are considered to have been incorporated herein in their entirety as published, as far as the detailed description and the drawings are concerned.

In FIG. 8 a series of modules 10 forming a plant surface structure is shown, on a sloping surface 2, forming a sloping surface area at an angle α relative to a horizontal plane X. Again obviously this can be a matrix of modules, forming a large plant area, such as a slope or dike body. In this embodiment the modules can be as described before. Though they are shown having a bottom 12B obviously they could be used without a bottom 12B, as shown in FIGS. 1 and 2 as well. The modules can be provided with openings 28A relatively high in the wall or walls 16, such that each module can still contain a suitable volume or body of water 32, as indicated by the water levels 32A in the various modules 10.

In embodiments the deck of the modules can be substantially closed, except for the open ends 24 of the pillars or at least some of the pillars. Substantially closed should be understood as including having openings so small that the growing medium can be supported on top of the deck substantially without falling through these small openings. In embodiments this can be achieved by closing off openings in the deck by for example plugs, lids or such elements.

According to the disclosure a plant surface structure or area can be formed by placing a series of modules 10 on a substructure. Preferably the modules 10 are coupled in rows and/or columns. Said modules 10 comprise a deck 8 and columns 18 opening into said deck 8. A series of said columns 18 is filled at least partly with a growing medium 38. On top of the modules 10 further growing medium 38 is provided, in fluid connection with the growing medium 38 in the or each column 18 filled at least partly with said growing medium 38. Water is provided or retained in said modules 10 for irrigation of the growing medium 38 on top of the modules through the growing medium in said columns 18 and/or for draining water from the growing medium 38 on top of said modules 10. To this end for example water can be flushed into and/or from said coupled modules, for example from a side of a series of modules. In embodiments water can be provided from the top of the growing medium, for example by rain and/or sprinklers or such artificial raining devices and/or by a tidal system, wherein part of the water can be retained inside the modules for later use.

Plant surface structures according to the disclosure can have the advantage that loads and forces provided on top thereof are distributed over relatively large areas, allowing higher loads and forces without becoming unlevel or uneven. A plant surface area of the disclosure can provide for suitable and substantially constant supply of water without the risk of over saturation and without the necessity of mechanical means for irrigation. A plant surface area according to the disclosure can have the advantage that a substructure can be protected, and that a plant area can be provided on substantially all kinds of substructures, permanently or temporarily. A plant surface area according to the disclosure can have the advantage that the base element or module can provide for flexibility and/or damping for example people or animals trafficking the area, such as on sportsfields, crowded areas such as at festivals or other such places. Plant surface areas according to the disclosure can have the advantage that they can provide for suitable plants on straight and sloping surfaces, can be formed quickly using any suitable substrate as a growing medium and allows for optimisation of irrigation and/or aeration of the growing medium and plants. Plant surface areas according to the description can have the advantage that locally irrigation can be optimised, for example by adaptation of the distribution of channels filled with growing medium and/or adaptation of the growing medium in said channels.

The present invention is by no means limited to the embodiments specifically disclosed in the drawings and description. Many variations are possible within the scope as defined by the claims. For example all combinations of parts of the embodiments shown in the drawings are considered to have been disclosed too. Base elements or modules as disclosed can be made by any methods and from different materials. Modules can be coupled in different manners and different ways or can be placed next to each other without coupling. They can be positioned in different orientations relative to each other, for example in a "half-stone" relationship for even more rigid connections. Modules can be stacked for obtaining a larger internal volume V in the structure. The modules can have different shapes and dimensions, for example polygonal. Preferably they can be coupled such that they can form a substantially continuous surface area. These and many such variations are considered falling within the scope of the claims.

The invention claimed is:

1. A plant surface structure, comprising one of an array of plastic base elements, each base element having a deck carried by a series of pillar elements, wherein the deck is provided with at least a number of the pillar elements having an open top end in said deck, wherein at least a membrane is placed over said deck and is provided with at least one of slits, cut-outs or water permeable elements, such that the at least one of the slits, cut-outs or water permeable elements open into at least some of the open top ends of pillars, wherein a growing medium is provided on the membrane and a growing medium is provided in said pillars.

2. The plant surface structure according to claim 1, wherein the growing medium provided on top of the membrane is the same as the growing medium in said pillars.

3. The plant surface structure according to claim 1, wherein the base elements are box shaped elements having an internal volume, which internal volume is in communication with the grow medium inside said pillars.

4. The plant surface according to claim 3, wherein the deck is an upper surface of a box shaped base elements or part thereof, whereas the box shaped element further comprises a bottom, connected to the deck by said pillars.

5. The plant surface structure according to claim 3, wherein the internal volume of the box shaped element is arranged for containing a volume of water.

6. The plant surface structure according to claim 1, wherein the deck is formed as at least one of:
- a substantially closed plane comprising an arrangement of openings, including open ends of pillars; or
- a structure of intersecting ribs extending between at least open ends of pillars and between open ends of pillars and side walls of the base element.

7. The plant surface structure according to claim 1, wherein the membrane extends into said pillar.

8. The plant surface structure according to claim 1, wherein a locking element is provided in or at an open top of at least one of the pillars, locking the membrane to the deck or the pillar.

9. The plant surface structure according to claim 8, wherein each locking element is inserted through a slit or cut-out in the membrane and engages the pillar or deck.

10. The plant surface according to claim 9, wherein the locking element engages the pillar or deck by a form lock.

11. The plant surface structure according to claim 1, wherein the base elements are interconnected, forming a base layer.

12. The plant surface structure according to claim 1, wherein the base elements are made of plastic.

13. The plant surface structure according to claim 1, wherein plant material is provided on or in said growing medium on said membrane.

14. The plant surface structure according to claim 1, wherein the membrane on top of the deck is water permeable.

15. The plant surface structure according to claim 1, wherein the membrane on top of the deck is water impermeable.

16. The plant surface structure according to claim 1, wherein the base elements are interconnected, such that they form a continuous internal volume.

17. The plant surface according to claim 1, wherein the growing medium in said pillars being in fluid contact with the growing medium on said membrane.

18. A base element for forming a plant surface structure, said base element comprising a deck carried by a at least one pillar element, wherein the at least one pillar element has an open top end in said deck, wherein at least one membrane is placed over said deck and is provided with at least one of slit, cut-out, or water permeable element, such that the at least one of the slit, cut-out, or water permeable element opens into the open top end of the at least one pillar, wherein a growing medium is provided on the membrane and a growing medium is provided in said pillars.

19. A method for forming a plant surface structure, wherein a series of modules is placed on a substructure, said modules comprising a deck and columns opening into said deck, wherein a series of said columns is filled at least partly with a growing medium, and wherein on top of the modules a growing medium is provided in fluid connection with the growing medium in each column filled at least partly with said growing medium, and wherein water is provided in said modules between the columns and below said deck, in communication with the growing medium in at least one of the series of said columns, for irrigation of the growing medium on top of the modules through the growing medium in said columns, and wherein a membrane is positioned on or over the decks of the modules, the growing medium being provided on top of the membrane, wherein openings are provided in the membrane, opening into the columns filled with growing medium.

20. The method according to claims 19, wherein the membrane is attached to the module in or at least one opening at least one column.

* * * * *